United States Patent
Chueh et al.

(10) Patent No.: US 8,693,218 B2
(45) Date of Patent: Apr. 8, 2014

(54) POWER ADAPTER AND METHOD OF CONTROLLING POWER ADAPTER OPERATED IN ENERGY SAVING MODE

(75) Inventors: Hung-Wen Chueh, Taoyuan Hsien (TW); Teng-Ping Lin, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 259 days.

(21) Appl. No.: 13/245,074

(22) Filed: Sep. 26, 2011

(65) Prior Publication Data

US 2012/0300505 A1 Nov. 29, 2012

Related U.S. Application Data

(60) Provisional application No. 61/489,768, filed on May 25, 2011.

(51) Int. Cl.
*H02M 3/335* (2006.01)

(52) U.S. Cl.
USPC .................................................. 363/21.15

(58) Field of Classification Search
USPC .......... 307/125, 126, 130, 131; 323/275, 285; 340/652, 653, 660–664, 686.1, 687; 363/21.15, 74, 78, 79, 95, 97, 146
See application file for complete search history.

(56) References Cited

U.S. PATENT DOCUMENTS

| | | | | |
|---|---|---|---|---|
| 5,297,015 A | * | 3/1994 | Miyazaki et al. | 363/146 |
| 6,088,128 A | * | 7/2000 | Nishii et al. | 358/434 |
| 7,034,513 B2 | * | 4/2006 | Gan et al. | 323/285 |
| 7,227,652 B2 | * | 6/2007 | Cronch et al. | 358/1.14 |
| 7,274,175 B2 | * | 9/2007 | Manolescu | 323/267 |
| 7,392,410 B2 | * | 6/2008 | Allen et al. | 713/310 |
| 7,911,817 B2 | * | 3/2011 | Kasprzak et al. | 363/146 |
| 2011/0157939 A1 | * | 6/2011 | Wang et al. | 363/125 |

* cited by examiner

*Primary Examiner* — Adolf Berhane
*Assistant Examiner* — Gary Nash
(74) *Attorney, Agent, or Firm* — Kirton McConkie; Evan R. Witt

(57) ABSTRACT

A power adapter comprises a main power circuit, a feedback circuit, an ID detection circuit and a switch controller. The feedback circuit is coupled to the main power circuit for detecting the DC output voltage and issuing a feedback signal. The ID detection circuit is coupled to the feedback circuit for detecting an ID signal from the DC-powered electronic device and issuing a control signal to the feedback circuit to disable or delay the feedback signal for a specific time period, and comparing a dropping slew rate of the DC output voltage with a preset value to issue a hiccup mode control signal. The switch controller is configured for controlling the operations of the main power circuit in response to the feedback signal and controlling the power adapter to operate in a normal operation mode or a hiccup mode in response to the hiccup mode control signal.

19 Claims, 7 Drawing Sheets

POWER ADAPTER AND METHOD OF CONTROLLING POWER ADAPTER OPERATED IN ENERGY SAVING MODE

CROSS-REFERENCE TO RELATED APPLICATION

This application claims the benefit of U.S. Provisional Application No. 61/489,768 filed on May 25, 2011, and entitled "POWER ADAPTER AND METHOD OF CONTROLLING POWER ADAPTER OPERATED IN ENERGY SAVING MODE", the entirety of which is hereby incorporated by reference.

FIELD OF THE INVENTION

The present invention relates to a power adapter, and more particularly to a power adapter and a method of controlling the power adapter operated in energy saving mode.

BACKGROUND OF THE INVENTION

As known, power adapters or power supplies are essential for many portable electronic devices such as laptop computers, notebook computers, tablet computers, communication products or network products. As shown in FIG. 1, a power adapter 1 is interconnected between a power source (e.g. a utility power source) and a portable electronic device 2 (e.g. a notebook computer) and configured to receive utility power and convert the utility power into a DC voltage required for powering the portable electronic device 2. The power adapter 1 principally includes an AC/DC power converter 10, a first power cord set 11 and a second power cord set 12. The first power cord set 11 includes a first electrical connector 111 and a first power cord 112. The first electrical connector 111 is detachably connected to a mating electrical connector 21 of the portable electronic device 2. The second power cord set 12 includes a second electrical connector 121 and a second power cord 122. The second electrical connector 121 is detachably connected to the utility power source. The second power cord set 12 is used to receive the utility power and delivery the utility power to the AC/DC power converter 10. By employing the AC/DC power converter 10, the utility power is converted into a DC voltage and the DC voltage is delivered to the portable electronic device 2 via the first power cord set 11 and the mating electrical connector 21 so as to power the portable electronic device 2.

Recently, low power loss and high efficiency are becoming basic requirements for power adapters or power supplies. However, when the conventional power adapter is plugged into a wall power source but not physically connected to a DC-powered electronic device, or when the conventional power adapter is plugged into a wall power source but is coupled to a DC-powered electronic device that is not drawing current, the conventional power adapter remains on and consumes energy. To minimize wasted energy under such operation conditions, U.S. Pat. No. 7,911,817 has disclosed systems and methods for controlling energy consumption of power adapters, as shown in FIG. 2. The power adapter is provided with an auto-sensing capability to sense when no DC load is present at the output of the power adapter by monitoring for absence of load-indicative signals communicated to the power adapter from a coupled DC-powered electronic device. Such an absence of load-indicative signals indicates that the power adapter is not connected to DC-powered electronic device, or that a connected DC-powered electronic device is inactive (i.e. drawing no power). Upon detection of such a no load condition, the power adapter enters a no load mode during which the power adapter output is turned off in order to reduce energy consumption by the power adapter, and only produces short recurring voltage pulses (hiccups) at the power adapter output. Upon detection of load-indicative signals communicated to the power adapter from a coupled DC-powered electronic device, the power adapter output enters a normal mode and provides its normal regulated power value to the power adapter output for powering the coupled DC-powered electronic device.

However, the load-indicative signal pin or the wire of the power adapter may be broken after a long time usage or an abnormal plug action between the electrical connector of the power adapter and the mating electrical connector of the DC-powered electronic device. If the load-indicative signal pin or the wire of the power adapter is broken, the power adapter will always regard that the power adapter is unplugged with the DC-powered electronic device so that the power adapter will always be operated in hiccup mode, which can't power the DC-powered electronic device normally.

SUMMARY OF THE INVENTION

It is an object of the present invention to provide a power adapter and a method of controlling the power adapter operated in energy saving mode so as to reduce the energy consumption and enhance the efficiency of the power adapter.

It is another object of the present invention to provide a power adapter having a power conversion system with an ID detection circuit for detecting the connection status between the power adapter and the DC-powered electronic device so that the energy consumption of the power adapter can be controlled accurately no matter the ID pin or the wire of the power adapter is broken or not.

It is a further object of the present invention to provide a novel system detection method for power adapter energy saving control.

It is a further object of the present invention to provide a hiccup mode control method for power adapter.

In accordance with an aspect of the present invention, a power adapter, which is detachably connected to a DC-powered electronic device, comprises a main power circuit, a feedback circuit, an ID detection circuit and a switch controller. The main power circuit is configured to convert an AC input voltage into a DC output voltage for supplying power to the DC-powered electronic device. The feedback circuit is coupled to the main power circuit for detecting the DC output voltage and issuing a feedback signal correspondingly. The ID detection circuit is coupled to the feedback circuit for detecting an ID signal from the DC-powered electronic device and issuing a control signal to the feedback circuit correspondingly to disable or delay the feedback signal for a specific time period, so that the DC output voltage is dropped, and comparing a dropping slew rate of the DC output voltage with a preset value to issue a hiccup mode control signal according to the compared result. The switch controller is coupled to the main power circuit, the feedback circuit and the ID detection circuit for controlling the operations of the main power circuit in response to the feedback signal so as to regulate the DC output voltage at a predetermined level, and controlling the power adapter to operate in a normal operation mode or a hiccup mode in response to the hiccup mode control signal.

In accordance with another aspect of the present invention, a power adapter, which is detachably connected to a DC-powered electronic device, comprises a main power circuit, a feedback circuit, an ID detection circuit and a switch controller. The main power circuit is configured to convert an AC input voltage into a DC output voltage for supplying power to the DC-powered electronic device. The switch controller is configured to control the operations of the main power circuit. The feedback circuit is coupled to the main power circuit and the switch controller for detecting the DC output voltage and issuing a feedback signal to the switch controller correspondingly, so that the switch controller regulates the DC output voltage at a predetermined level according to the feedback signal. The ID detection circuit is coupled to the feedback circuit and the switch controller for detecting an ID signal from the DC-powered electronic device and issuing a control signal to the feedback circuit correspondingly to disable or delay the feedback signal for a specific time period, so that the DC output voltage is dropped, and comparing a dropping slew rate of the DC output voltage with a preset value to issue a hiccup mode control signal in response to the compared result so that the switch controller controls the power adapter to operate in a normal operation mode or a hiccup mode in response to the hiccup mode control signal. When the dropping slew rate of the DC output voltage is higher than the preset value, the switch controller controls the power adapter to operate in the normal operation mode, and when the dropping slew rate of the DC output voltage is lower than the preset value, the switch controller controls the power adapter to operate in the hiccup mode.

In accordance with a further aspect of the present invention, a power adapter is used to convert an AC input voltage into a DC output voltage for supplying power to a DC-powered electronic device and comprises a main power circuit, a feedback circuit, an ID detection circuit and a switch controller. The method of controlling a power adapter operated in energy saving mode comprises the steps of (a) detecting variations on the DC output voltage outputted from the main power circuit and issuing a feedback signal by the feedback circuit correspondingly; (b) detecting an ID signal from the DC-powered electronic device and issuing a control signal by the ID detection circuit correspondingly; (c) disabling or delaying the feedback signal for a specific time period according to the control signal by the feedback circuit, so that the DC output voltage is dropped; (d) comparing a dropping slew rate of the DC output voltage with a preset value to issue a hiccup mode control signal by the ID detection circuit correspondingly; and (e) regulating the DC output voltage at a predetermined level according to the feedback signal and controlling the power adapter to operate in a normal operation mode or a hiccup mode in response to the hiccup mode control signal by the switch controller.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
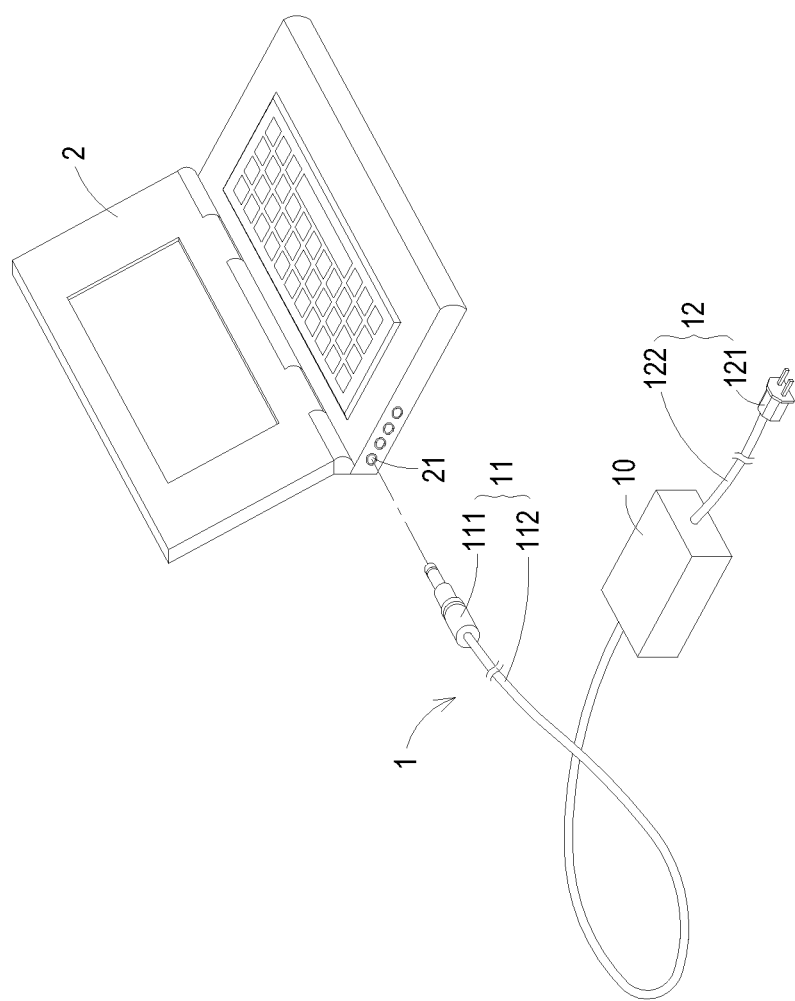
FIG. 1 schematically illustrates a power adapter interconnected between a power source and a portable electronic device for powering the portable electronic device.
Figure 2:
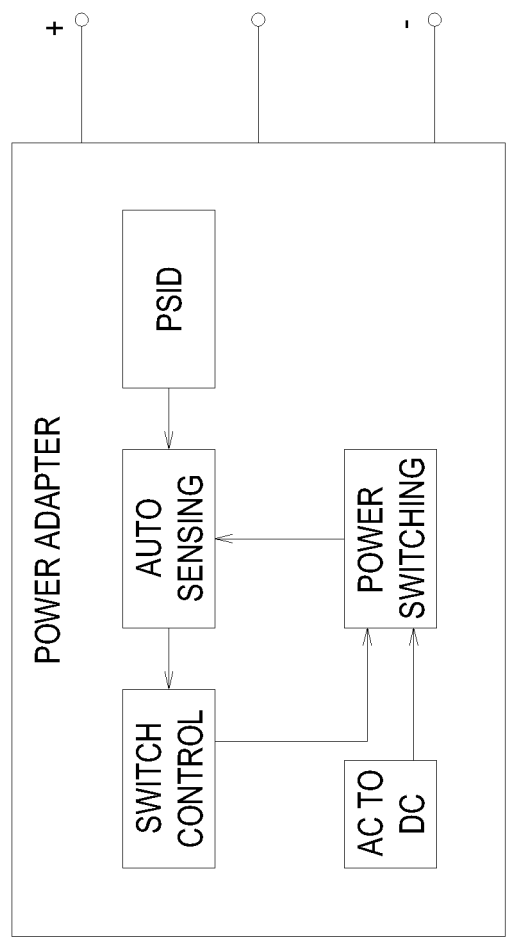
FIG. 2 is a simplified block diagram of a conventional AC/DC power adapter.
Figure 3:
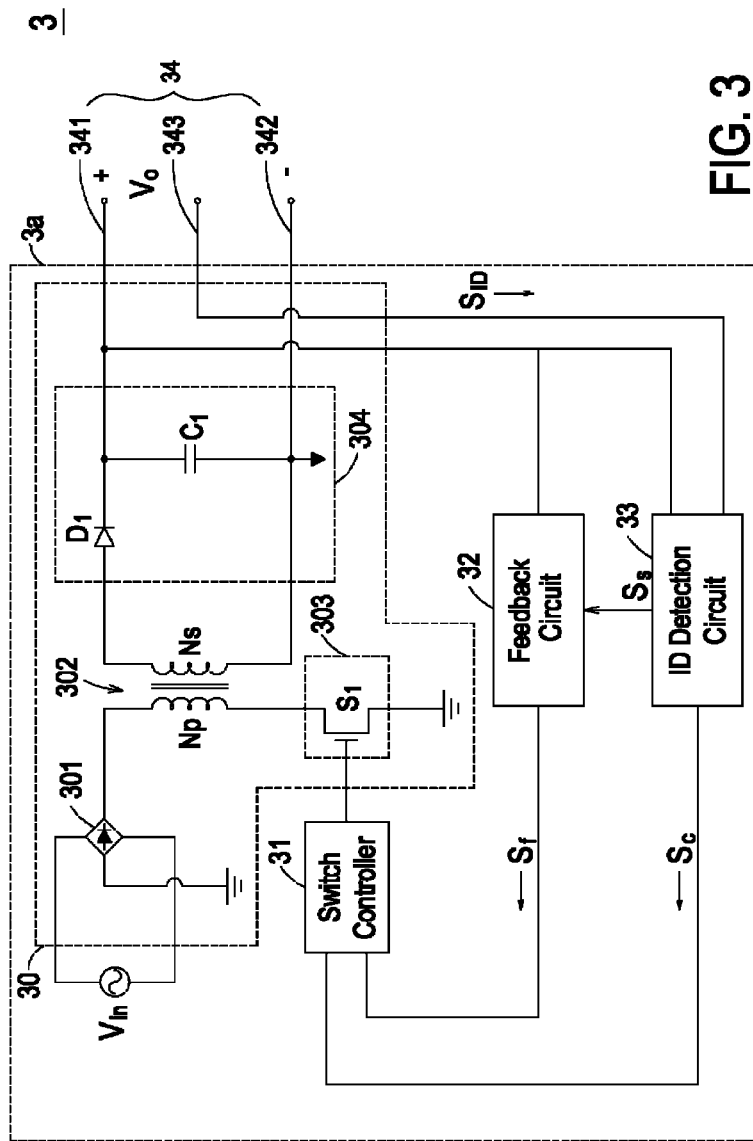
FIG. 3 is a circuit diagram of a power conversion system of a power adapter according to one preferred embodiment of the present invention.

FIG. 3 is a circuit diagram of a power conversion system of a power adapter according to one preferred embodiment of the present invention. As shown in FIG. 3, the power adapter 3 includes a power conversion system 3a for receiving an AC input voltage $V_{in}$ and generating a DC output voltage $V_o$ required for the system circuit of the DC-powered electronic device (i.e. portable DC-powered electronic device). The power conversion system 3a includes a main power circuit 30, a switch controller 31, a feedback circuit 32 and an ID detection circuit 33. The main power circuit 30 includes a bridge rectifier 301, a transformer 302, a switch circuit 303 and a rectifier/filter circuit 304, but it is not limited thereto. The bridge rectifier 301 is configured to receive the AC input voltage $V_{in}$ from the utility power source and rectify the AC input voltage $V_{in}$ into a full-wave rectified DC voltage. The transformer 302 has a primary winding $N_p$ and a secondary winding $N_s$. The primary winding $N_p$ of the transformer 302 is coupled to the bridge rectifier 301 and configured to store energy from the AC input voltage $V_{in}$ when the switch S1 of the switch circuit 303 which is connected in series with the primary winding $N_p$ is ON and release the stored energy to the secondary winding $N_s$ when the switch S1 of the switch circuit 303 is OFF. The switch $S_1$ of the switch circuit 303 is coupled to the switch controller 31, and the switching operations of the switch $S_1$ are manipulated by the switch controller 31 such as a pulse-width modulator controller (PWM controller). The rectifier/filter circuit 304 is connected to the secondary winding Ns of the transformer 302 and includes a rectifying diode $D_1$ and a filtering capacitor $C_1$. The rectifier/filter circuit 304 is configured to perform rectification and filtration to the energy received by the secondary winding $N_s$ so as to generate a desired DC output voltage $V_o$ for powering the DC-powered electronic device via the positive pin 341 and negative pin 342 of the electrical connector 34.

The switch controller 31 is configured to control the DC output voltage $V_o$ outputted via the positive pin 341 and negative pin 342 of the electrical connector 34 by controlling the duty cycle of the switch $S_1$ of the switch circuit 303 between ON and OFF status. The feedback circuit 32 (i.e. output regulation circuit) is coupled to the switch controller 31, the output terminal of the main power circuit 30 (i.e. the positive pin 341) and the ID detection circuit 33. The feedback circuit 32 is configured to detect variations on the DC output voltage $V_o$ and in response thereto issue a feedback signal $S_f$ to the switch controller 31 for enabling the switch controller 31 to stabilize and regulate the DC output voltage $V_o$ at a predetermined level by controlling the switching operations of the switch $S_1$. The ID detection circuit 33 is coupled to the ID pin 343 of the electrical connector 34, the feedback circuit 32 and the switch controller 31. The ID detection circuit 33 is configured to detect the connection status between power adapter 3 and the DC-powered electronic device (not shown in FIG. 3) by sensing an ID signal $S_{ID}$ from the DC-powered electronic device, issuing a control signal Ss to disable the feedback signal $S_f$ from the feedback circuit 32 for a specific time period, detecting the variations of the DC output voltage $V_o$ (e.g. the dropping slew rate of the DC output voltage) and comparing the dropping slew rate of the DC output voltage with a preset value. Wherein the ID signal $S_{ID}$ is on high level when the power adapter 3 is disconnected with the DC-powered electronic device or the DC-powered electronic device connected to the power adapter 3 is inactive, and the ID signal $S_{ID}$ is on low level when the power adapter 3 is connected to the DC-powered electronic device or the DC-powered electronic device connected to the power adapter is operating. After the detection process is performed, the ID detection circuit 33 is configured to issue a hiccup mode control signal $S_c$ to the switch controller 31 according to the detected results. When the dropping slew rate of the DC output voltage $V_o$ is higher than the preset value, the ID detection circuit 33 issues a hiccup mode control signal Sc under a disable status to the switch controller 31. The feedback signal $S_f$ will be issued to the switch controller 31 again after the specific time period. Accordingly, the power adapter 3 will return to a normal operation mode and output the required DC output voltage $V_o$ to the DC-powered electronic device. When the dropping slew rate of the DC output voltage $V_o$ is lower than the preset value, the ID detection circuit 33 issues a hiccup mode control signal Sc under an enable status to the switch controller 31. Accordingly, the power adapter 3 will be operated in hiccup mode to save power. In an embodiment, the feedback circuit 32 may comprise one or more transistors, but it is not limited thereto. In an embodiment, the ID detection circuit 33 may comprise an auto sensing unit for detecting the ID signal $S_{ID}$. Alternatively, the ID detection circuit 33 may comprise an auto sensing unit for detecting the ID signal $S_{ID}$ and a power supply identification unit in communication with a corresponding power supply identification unit of the DC-powered electronic device for identifying the ID signal $S_{ID}$, but it is not limited thereto.

Figure 4A:
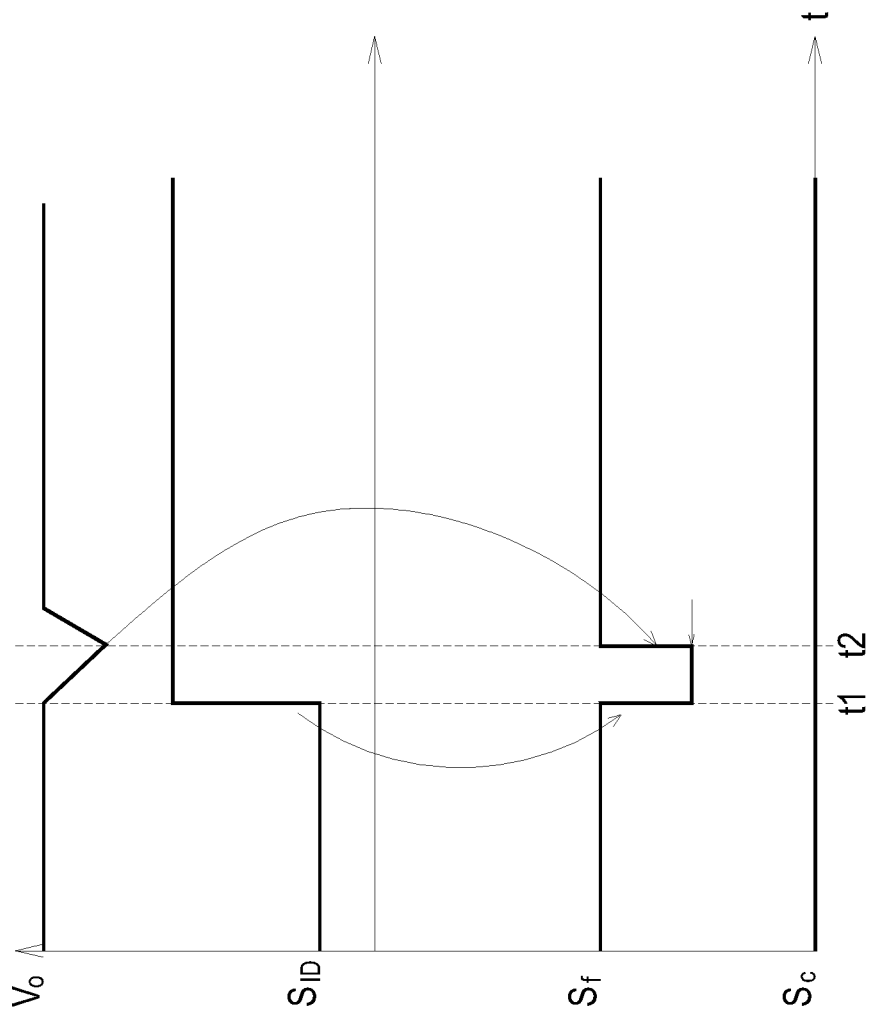
FIG. 4A is a waveform showing the relationship between the output voltage Vo, the ID signal $S_{ID}$, the feedback signal $S_f$ and the hiccup mode control signal Sc when the power adapter is plugged with the DC-powered electronic device for powering the DC-powered electronic device and the ID pin or the wire of the power adapter is broken after the power adapter is plugged with the DC-powered electronic device.

FIG. 4A is a waveform showing the relationship between the output voltage $V_o$, the ID signal $S_{ID}$, the feedback signal $S_f$ and the hiccup mode control signal $S_c$ when the power adapter is plugged with the DC-powered electronic device for powering the DC-powered electronic device and the ID pin or wire of the power adapter is broken after the power adapter is plugged with the DC-powered electronic device. As shown in FIGS. 3 and 4A, the ID detection circuit 33 can detect the connection status between the power adapter 3 and the DC-powered electronic device by sensing the ID signal $S_{ID}$ from the DC-powered electronic device and detecting the dropping slew rate of the DC output voltage $V_o$. When the ID signal $S_{ID}$ is changed from low to high since the power adapter 3 is plugged with the DC-powered electronic device for powering the DC-powered electronic device and the ID pin or wire of the power adapter 3 is broken after the power adapter 3 is plugged with the DC-powered electronic device and detected by the ID detection circuit 33 (e.g. the detected ID signal $S_{ID}$ is changed from low to high) at a first time $t_1$, instead of sending out the hiccup mode control signal $S_c$ to the switch controller 31 directly, the ID detection circuit 33 issues a control signal Ss to the feedback circuit 32 first, and then the feedback circuit 32 will disable or delay to issue the feedback signal $S_f$ to the switch controller 31 for a specific time period. During this time period, the DC output voltage $V_o$ outputted via the positive pin 341 and the negative pin 342 will be dropped accordingly. The ID detection circuit 33 can detect the dropping slew rate of the DC output voltage $V_o$ and compare the dropping slew rate of the DC output voltage $V_o$ with a preset value. If the dropping slew rate of the DC output voltage $V_o$ is higher than a preset value, the ID detection circuit 33 determines that the power adapter 3 is having some loading, the power adapter 3 is connected to the system circuit of the DC-powered electronic device and the ID pin or wire of the power adapter 3 is broken. In this operation situation, the ID detection circuit 33 will issue a hiccup mode control signal Sc under a disable status to the switch controller 31. The feedback signal $S_f$ will be issued to the switch controller 31 again at a second time $t_2$. Accordingly, the power adapter 3 will return to a normal operation mode and output the required DC output voltage $V_o$ to the DC-powered electronic device.

Figure 4B:
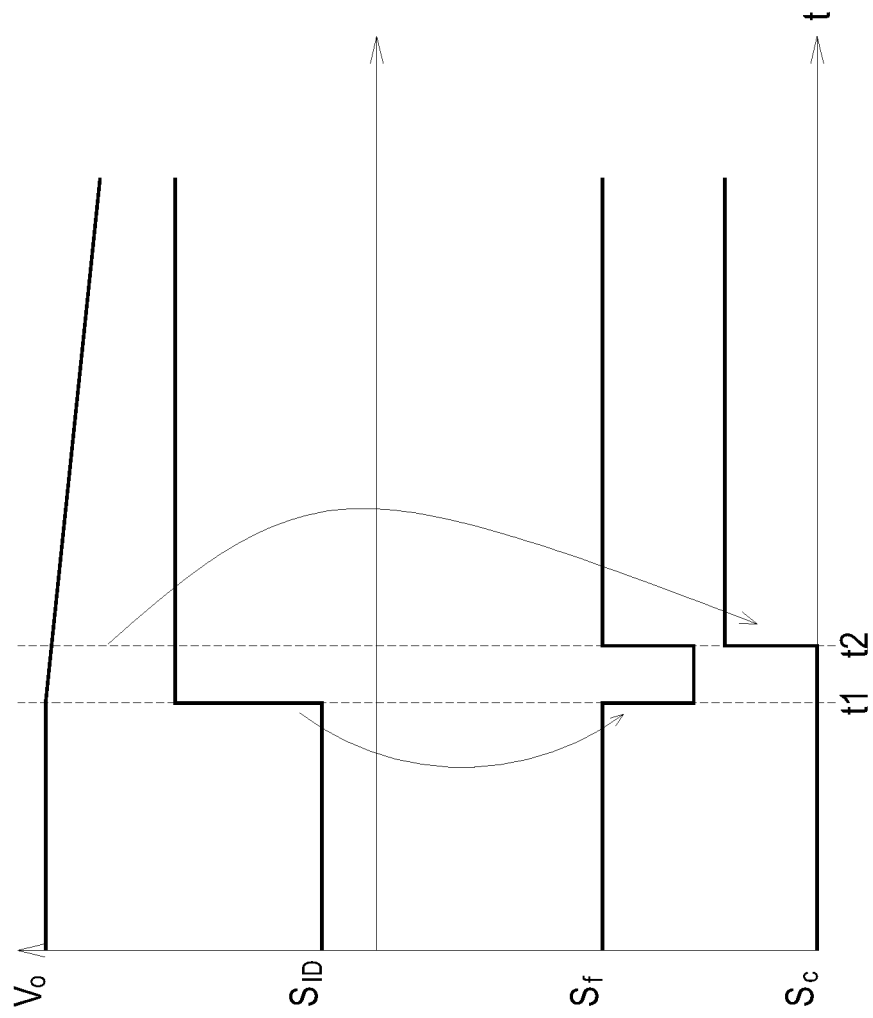
FIG. 4B is a waveform showing the relationship between the output voltage Vo, the ID signal $S_{ID}$, the feedback signal $S_f$ and the hiccup mode control signal Sc when the power adapter is unplugged with the DC-powered electronic device.

FIG. 4B is a waveform showing the relationship between the output voltage $V_o$, the ID signal $S_{ID}$, the feedback signal $S_f$ and the hiccup mode control signal Sc when the power adapter is unplugged with the DC-powered electronic device or the DC-powered electronic device is not drawing current. As shown in FIGS. 3 and 4B, the ID detection circuit 33 can detect the connection status between the power adapter 3 and the DC-powered electronic device by sensing the ID signal $S_{ID}$ from the DC-powered electronic device and detecting the dropping slew rate of the DC output voltage $V_o$. When the ID signal $S_{ID}$ is changed from low to high since the power adapter 3 is unplugged with the DC-powered electronic device or the DC-powered electronic device is not drawing current and detected by the ID detection circuit 33 at a first time $t_1$, instead of sending out the hiccup mode control signal $S_c$ to the switch controller 31 directly, the ID detection circuit 33 issues a control signal Ss to the feedback circuit 32 first, and then the feedback circuit 32 will disable or delay to issue the feedback signal $S_f$ to the switch controller 31 for a specific time period. During this time period, the DC output voltage $V_o$ outputted via the positive pin 341 and the negative pin 342 will be dropped accordingly. The ID detection circuit 33 can detect the dropping slew rate of the DC output voltage $V_o$ and compare the dropping slew rate of the DC output voltage $V_o$ with a preset value. If the dropping slew rate of the DC output voltage $V_o$ is lower than the preset value, the ID detection circuit 33 determines that the power adapter 3 is changed to operate at a no load mode, the power adapter 3 is unplugged with and disconnected to the DC-powered electronic device and the DC-powered is not drawing current at the first time $t_1$. In this operation situation, the ID detection circuit 33 changes the hiccup mode control signal $S_c$ from a disable status to an enable status and issues the hiccup mode control signal $S_c$ to the switch controller 31. Accordingly, the power adapter 3 will be operated in the hiccup mode to save power.

Figure 4C:
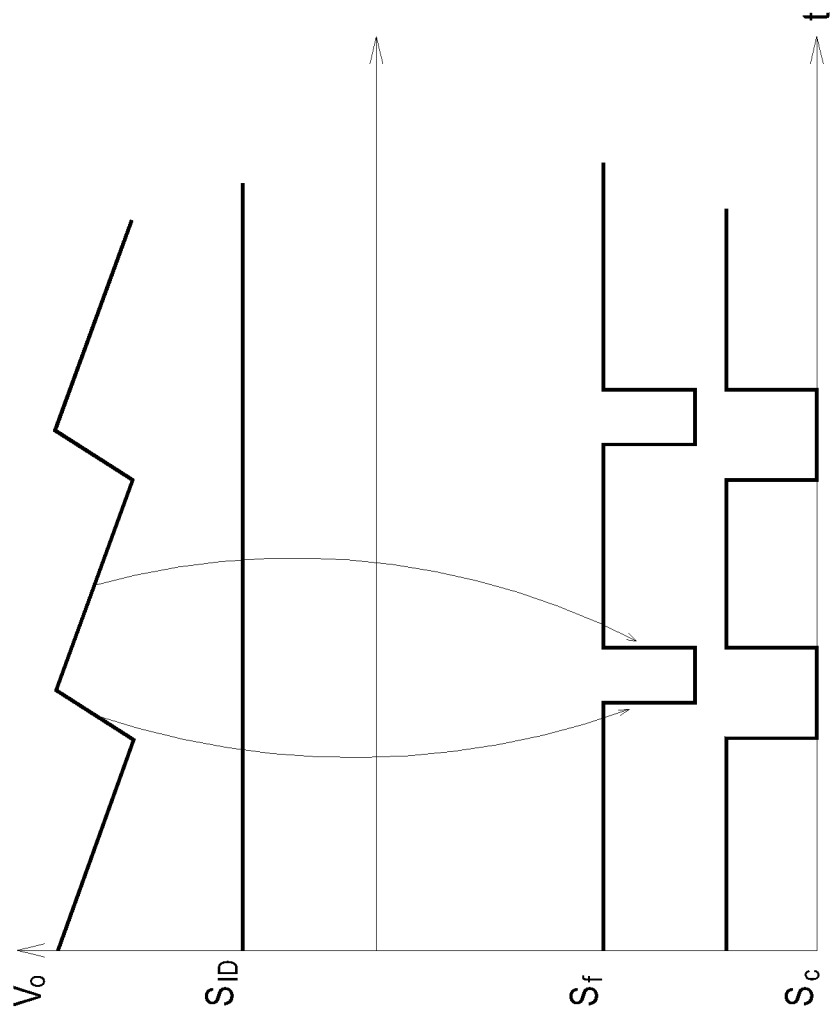
FIG. 4C is a waveform showing the relationship between the output voltage Vo, the ID signal $S_{ID}$, the feedback signal $S_f$ and the hiccup mode control signal Sc when the power adapter is operated in normal no load hiccup mode.

FIG. 4C is a waveform showing the relationship between the output voltage $V_o$, the ID signal $S_{ID}$, the feedback signal $S_f$ and the hiccup mode control signal $S_c$ when the power adapter is operated in normal no load hiccup mode. As shown in FIGS. 3 and 4C, when the power adapter 3 operates in hiccup, the ID detection circuit 33 can continuously detect the connection status between the power adapter 3 and the DC-powered electronic device by sensing the ID signal $S_{ID}$ from the DC-powered electronic device and detecting the dropping slew rate of the DC output voltage $V_o$. When the ID signal $S_{ID}$ is always high and detected by the ID detection circuit 33, instead of sending out the hiccup mode control signal $S_c$ to the switch controller 31 directly, the ID detection circuit 33 issues a control signal Ss to the feedback circuit 32 first, and then the feedback circuit 32 will disable or delay to issue the feedback signal $S_f$ to the switch controller 31 for a specific time period. During this time period, the DC output voltage $V_o$ outputted via the positive pin 341 and the negative pin 342 will be dropped accordingly. The ID detection circuit 33 can detect the dropping slew rate of the DC output voltage $V_o$ and compare the dropping slew rate of the DC output voltage $V_o$ with a preset value. If the dropping slew rate of the DC output voltage $V_o$ is lower than a preset value, the ID detection circuit 33 determines that the power adapter 3 is in normal no load hiccup mode. In the normal hiccup mode, the ID detection circuit 33 will disable the feedback signal $S_f$ for a specific time period from the feedback circuit 32 at every hiccup cycle and detect the dropping slew rate of the DC output voltage $V_o$ at every hiccup cycle. If the dropping slew rate of the DC output voltage $V_o$ is lower than a preset value, the power adapter 3 will continue to perform the hiccup mode to save power.

Figure 4D:
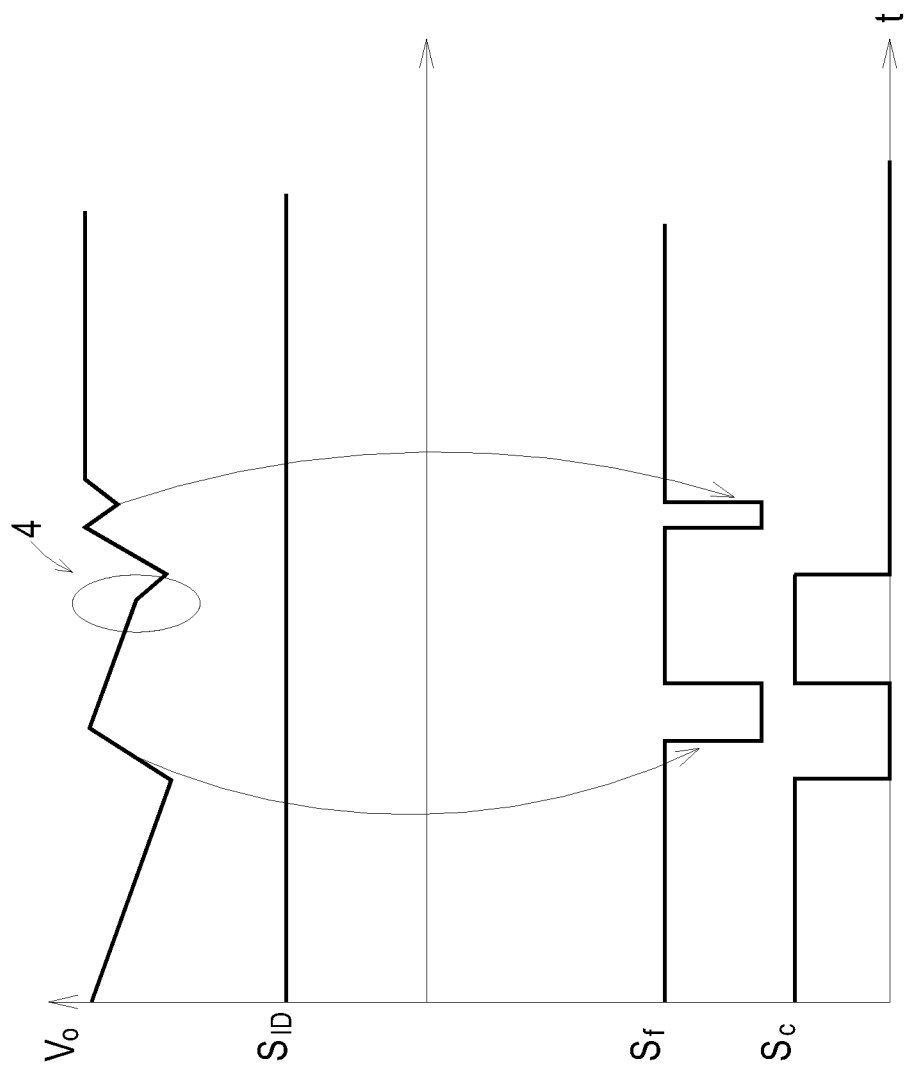
FIG. 4D is a waveform showing the relationship between the output voltage Vo, the ID signal $S_{ID}$, the feedback signal $S_f$ and the hiccup mode control signal Sc when the power adapter with a broken ID pin or wire is plugged with the DC-powered electronic device for powering the DC-powered electronic device.

FIG. 4D is a waveform showing the relationship between the output voltage $V_o$, the ID signal $S_{ID}$, the feedback signal $S_f$ and the hiccup mode control signal $S_c$ when the power adapter with a broken ID pin or wire is plugged with the DC-powered electronic device for powering the DC-powered electronic device. As shown in FIGS. 3 and 4D, when the power adapter 3 operates in hiccup mode, the ID detection circuit 33 can continuously detect the connection status between the power adapter 3 and the DC-powered electronic device by sensing the change of the ID signal $S_{ID}$ from the DC-powered electronic device and detecting the dropping slew rate of the DC output voltage $V_o$. If the power adapter 3 with broken ID pin or wire is plugged into the system circuit of the DC-powered electronic device, the ID signal $S_{ID}$ won't be able to indicate the plug action between the power adapter 3 and the DC-powered electronic device in situation, so that ID signal $S_{ID}$ will remain high level. The ID detection circuit 33 will disable the feedback signal $S_f$ for a specific time period from the feedback circuit 32 at every hiccup cycle. When the power adapter 3 is plugged with the system circuit of the DC-powered electronic device (as indicated in numerical character 4), the ID detection circuit 33 will detect that the dropping slew rate of the DC output voltage $V_o$ is higher than a preset value (i.e. the ID detection circuit 33 will detect the dropping slew rate of the DC output voltage $V_o$ is higher than a preset value after next hiccup cycle, after the output voltage reaches the maximum value). If the ID detection circuit 33 detects that the dropping slew rate of the DC output voltage $V_o$ is higher than a preset value, the ID detection circuit 33 will issue the hiccup mode control signal $S_c$ under disable status to the switch controller 31 and power adapter 3 will be operated in a normal mode.

From the above description, the present invention provides a power adapter, a method of controlling the power adapter operated in energy saving mode and a hiccup mode control method for power adapter so as to reduce the energy consumption and enhance the efficiency of the power adapter. The inventive power adapter has a power conversion system with an ID detection circuit for detecting the connection status between the power adapter and the DC-powered electronic device so that the energy consumption of the power adapter can be controlled accurately no matter the ID pin or wire of the power adapter is broken or not.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power adapter detachably connected to a DC-powered electronic device, comprising:
    a main power circuit configured to convert an AC input voltage into a DC output voltage for supplying power to said DC-powered electronic device;
    a feedback circuit coupled to said main power circuit for detecting said DC output voltage and issuing a feedback signal correspondingly;
    an ID detection circuit coupled to said feedback circuit for detecting an ID signal from said DC-powered electronic device and issuing a control signal to said feedback circuit correspondingly to disable or delay said feedback signal for a specific time period, so that said DC output voltage is dropped, and comparing a dropping slew rate of said DC output voltage with a preset value to issue a hiccup mode control signal according to the compared result; and
    a switch controller coupled to said main power circuit, said feedback circuit and said ID detection circuit for controlling the operations of said main power circuit in response to said feedback signal so as to regulate said DC output voltage at a predetermined level, and controlling said power adapter to operate in a normal operation mode or a hiccup mode in response to said hiccup mode control signal;
    wherein when said dropping slew rate of said DC output voltage is higher than said preset value, said switch controller controls said power adapter to operate in said normal operation mode, and when said dropping slew rate of said DC output voltage is lower than said preset value, said switch controller controls said power adapter to operate in said hiccup mode.

2. The power adapter according to claim 1, wherein the status of said ID signal is changed correspondingly with the connection relationship between said power adapter and said DC-powered electronic device or with the operating status of said DC-powered electronic device connected to said power adapter.

3. The power adapter according to claim 1, wherein said ID signal is on high level when said power adapter is disconnected with said DC-powered electronic device or said DC-powered electronic device connected to said power adapter is inactive, and said ID signal is on low level when said power adapter is connected to said DC-powered electronic device or said DC-powered electronic device connected to said power adapter is operating.

4. The power adapter according to claim 3, wherein when said ID signal is changed from low level to high level since said adapter is plugged with said DC-powered electronic device for powering said DC-powered electronic device and a ID pin or wire of said power adapter is broken after said power adapter is plugged with said DC-powered electronic device, said ID detection circuit correspondingly issues said control signal to said feedback circuit to disable or delay said feedback signal for said specific time period, so that said DC output voltage is dropped, and said ID detection circuit issues said hiccup mode control signal under disable status to control said power adapter to operate in said normal operation mode when said dropping slew rate of said DC output voltage is higher than said preset value.

5. The power adapter according to claim 3, wherein when said ID signal is changed from low level to high level since said power adapter is disconnected with said DC-powered electronic device or said DC-powered electronic device connected to said power adapter is inactive, said ID detection circuit correspondingly issues said control signal to said feedback circuit to disable or delay said feedback signal for said specific time period, so that said DC output voltage is dropped, and said ID detection circuit issues said hiccup mode control signal under enable status to control said power adapter to operate in said hiccup mode when said dropping slew rate of said DC output voltage is lower than said preset value.

6. The power adapter according to claim 5, wherein when said power adapter operates in said hiccup mode, said ID detection circuit continuously issues said control signal to disable or delay said feedback signal for a specific time period from said feedback circuit at every hiccup cycle and compares said dropping slew rate of said DC output voltage with said preset value at every hiccup cycle, and said ID detection circuit issues said hiccup mode control signal under disable status to control said power adapter operate in said normal operation mode when said dropping slew rate of said DC output voltage is higher than said preset value.

7. The power adapter according to claim 5, wherein when said power adapter operates in said hiccup mode, said ID detection circuit continuously issues said control signal to disable or delay said feedback signal for a specific time period from said feedback circuit at every hiccup cycle and compares said dropping slew rate of said DC output voltage with said preset value at every hiccup cycle, and said ID detection circuit issues said hiccup mode control signal under enable status to control said power adapter to operate in said hiccup mode continuously when said dropping slew rate of said DC output voltage is lower than said preset value.

8. The power adapter according to claim 1, wherein said main power circuit comprises:
   a bridge rectifier configured to perform a full-wave rectification to said AC input voltage;
   a transformer comprising a primary winding connected to said bridge rectifier and a secondary winding;
   a switch circuit connected with said primary winding in series and coupled to said switch bridge rectifier, wherein the switching operations of said switch circuit are manipulated by said switch controller so that the energy stored in said primary winding releases to said secondary winding; and
   a rectifier/filter circuit configured to perform rectification and filtration to the energy received by said secondary winding so as to generate said DC output voltage.

9. The power adapter according to claim 8, wherein said switch controller is a pulse-width modulator controller.

10. The power adapter according to claim 8, wherein said rectifier/filter circuit includes a rectifying diode and a filtering capacitor.

11. The power adapter according to claim 1, wherein said power adapter further comprises an electrical connector which comprises an ID pin for receiving said ID signal.

12. The power adapter according to claim 11, wherein said electrical connector further comprises a positive pin and a negative pin for outputting said DC output voltage.

13. A power adapter detachably connected to a DC-powered electronic device, comprising:
   a main power circuit configured to convert an AC input voltage into a DC output voltage for supplying power to said DC-powered electronic device;
   a switch controller configured to control the operations of said main power circuit;
   a feedback circuit coupled to said main power circuit and said switch controller for detecting said DC output voltage and issuing a feedback signal to said switch controller correspondingly, so that said switch controller regulates said DC output voltage at a predetermined level according to said feedback signal; and
   an ID detection circuit coupled to said feedback circuit and said switch controller for detecting an ID signal from said DC-powered electronic device and issuing a control signal to said feedback circuit correspondingly to disable or delay said feedback signal for a specific time period, so that said DC output voltage is dropped, and comparing a dropping slew rate of said DC output voltage with a preset value to issue a hiccup mode control signal in response to the compared result so that said switch controller controls said power adapter to operate in a normal operation mode or a hiccup mode in response to said hiccup mode control signal;
   wherein when said dropping slew rate of said DC output voltage is higher than said preset value, said switch controller controls said power adapter to operate in said normal operation mode, and when said dropping slew rate of said DC output voltage is lower than said preset value, said switch controller controls said power adapter to operate in said hiccup mode.

14. The power adapter according to claim 13, wherein said hiccup mode control signal is in disable status when said dropping slew rate of said DC output voltage is higher than said preset value, and said hiccup mode control signal is in enable status when said dropping slew rate of said DC output voltage is lower than said preset value.

15. The power adapter according to claim 14, wherein when said power adapter operates in said hiccup mode, said ID detection circuit continuously issues said control signal to disable or delay said feedback signal for a specific time period from said feedback circuit at every hiccup cycle and compares said dropping slew rate of said DC output voltage with said preset value at every hiccup cycle, so that said ID detection circuit issues said hiccup mode control signal under disable status to control said power adapter to change to operate in said normal operation mode when said dropping slew rate of said DC output voltage is higher than said preset value, or issues said hiccup mode control signal under enable status to control said power adapter to operate in said hiccup mode continuously when said dropping slew rate of said DC output voltage is lower than said preset value.

16. A method of controlling a power adapter operated in an energy saving mode, wherein said power adapter is used to convert an AC input voltage into a DC output voltage for supplying power to a DC-powered electronic device and comprises a main power circuit, a feedback circuit, an ID detection circuit and a switch controller, said method comprising the steps of:
   (a) detecting variations on said DC output voltage outputted from said main power circuit and issuing a feedback signal by said feedback circuit correspondingly;
   (b) detecting an ID signal from said DC-powered electronic device and issuing a control signal by said ID detection circuit correspondingly;

(c) disabling or delaying said feedback signal for a specific time period according to said control signal by said feedback circuit, so that said DC output voltage is dropped;

(d) comparing a dropping slew rate of said DC output voltage with a preset value to issue a hiccup mode control signal by said ID detection circuit correspondingly; and (e) regulating said DC output voltage at a predetermined level according to said feedback signal and controlling said power adapter to operate in a normal operation mode or a hiccup mode in response to said hiccup mode control signal by said switch controller, wherein when said dropping slew rate of said DC output voltage is higher than said preset value, said switch controller controls said power adapter to operate in said normal operation mode, and when said dropping slew rate of said DC output voltage is lower than said preset value, said switch controller controls said power adapter to operate in said hiccup mode.

17. The method according to claim 16, wherein the status of said ID signal is changed correspondingly with the connection relationship between said power adapter and said DC-powered electronic device or with the operating status of said DC-powered electronic device connected to said power adapter.

18. The method according to claim 16, wherein said ID signal is on high level when said power adapter is disconnected with said DC-powered electronic device or said DC-powered electronic device connected to said power adapter is inactive, and said ID signal is on low level when said power adapter is connected to said DC-powered electronic device or said DC-powered electronic device connected to said power adapter is operating.

19. The method according to claim 16, wherein in the step (d), said hiccup mode control signal is in disable status when said dropping slew rate of said DC output voltage is higher than said preset value, and said hiccup mode control signal is in enable status when said dropping slew rate of said DC output voltage is lower than said preset value.

* * * * *